United States Patent Office 2,826,565
Patented Mar. 11, 1958

2,826,565

METHOD FOR PRODUCING A VOID-FREE THERMOSETTING CASTING FROM LIQUID POLYBUTADIENE

Willie W. Crouch and James T. Edmonds, Jr., Bartlesville, Okla., assignors to Phillips Petroleum Company, a corporation of Delaware No Drawing. Application January 20, 1955
Serial No. 483,162

11 Claims. (Cl. 260—85.1)

This invention relates to improved castings from liquid polymers. In one of its aspects, this invention relates to void-free castings from liquid polymers of conjugated dienes. In a more specific aspect, this invention relates to void-free castings produced from liquid polybutadiene.

In recent years, considerable work has been done in preparing liquid polymers of conjugated dienes. These liquid polymers can be prepared by any method known in the art such as by emulsion polymerization but most frequently are prepared by sodium catalyzed mass polymerization. For example, it is known in the art that conjugated dienes can be polymerized under certain conditions to form liquid polymers. Liquid polymers refer to polymerized conjugated dienes having a viscosity in the range of 100 to 6000 Saybolt Furol seconds at 100° F. and generally having a molecular weight in the range between 300 and 3000. The preceding specifications for liquid polymers refer to liquid polymers of conjugated dienes before they have been stripped by the process of this invention, as the viscosity of the stripped polymer is considerably higher than the viscosity of the polymer before stripping. The liquid polymers can be obtained by such known methods as mass or emulsion polymerization. One method for producing such liquid polymers is disclosed in U. S. Patent 2,631,175.

While polymers of conjugated dienes as described above are useful in the fields of drying oils, coatings, adhesives, and rubber compounding, the material cannot be used, as such, as a satisfactory material for castings, since castings prepared directly from liquid polymers of conjugated dienes, as described above, contain a large number of voids. These voids are believed to be due to volatile components present in this liquid polymer which vaporize during the molding or casting process thus causing vapor bubbles. This void formation occurs even with polymers from which all solvent which was present during the polymerization step has been carefully removed. That is, the voids are formed due to the pressure of a material other than the hydrocarbon solvent which is believed to be low molecular weight polymer.

It is now discovered that void-free castings can be prepared from liquid polymers of conjugated diene if the liquid polymer is subjected to a stripping process wherein the polymer is heated under atmospheric pressure or less and an inert gas is simultaneously passed through the polymer. Void-free castings can then be prepared by pouring into molds and thermally polymerizing the thus stripped liquid polymer. This invention comprises stripping a liquid polydiene with an inert gas and casting the resulting stripped material into suitable molds. In general, having an unstripped liquid polydiene, to carry out the invention, an inert gas will be passed through the liquid polymer under suitable stripping conditions, the thus stripped polymer will be cast into molds, the polymer set by the application of heat, and the void-free polymer recovered from the mold. The degree of heat and time will be dependent upon the particular polymer, presence of activators, etc.

An object of this invention is to provide a method of preparing void-free castings.

A second object of this invention is to provide a method for improving the quality of castings made from a liquid polymer of a conjugated diene.

Another object of this invention is to provide a method of treating liquid polymer of conjugated dienes.

Still another object of this invention is to provide a method for producing void-free castings from liquid polybutadiene.

Other objects, features advantages of this invention will be obvious to those skilled in the pertinent art having been given this disclosure.

The process of this invention is applicable to liquid polymers (including homopolymers and copolymers) of a conjugated diene. These dienes can be polymerized alone, with other conjugated dienes, or with one or more other copolymerizable materials. However, when copolymers are prepared, at least 50 weight percent of the charged monomers (monomer charged to the polymerization reaction) should be conjugated dienes. The preferred conjugated dienes are those which contain from four to six carbon atoms per molecule, but those containing more carbon atoms per molecule, e. g., eight can also be used. Examples of such conjugated dienes include 1,3-butadiene, isoprene, piperylene, methylpentadiene, 2,3-dimethyl-1,3-butadiene, and the like. Monomers copolymerizable with such conjugated dienes include unsaturated comonomers such as styrene, alpha-methyl styrene, alpha-methyl-para-methylstyrene, halogenated styrenes such as 2-chlorostyrene and 3-bromostyrene, acrylonitrile, methacrylonitrile, acrylic- and methacrylic acid esters such as methyl acrylate and methyl methacrylate, fumaric acid esters such as ethyl fumarate, unsaturated ketones such as methyl vinyl ketone and methyl isopropenyl ketone, and similar copolymerizable monomers.

As has been indicated, methods for preparing liquid homopolymers and copolymers from conjugated dienes are known in the art. However, our invention is not dependent upon the method of preparing the liquid polymer and such liquid polymers prepared by any method can be treated by the method of this invention.

In particular this invention is applicable to liquid homopolymers or copolymers of 1,3-butadiene which will be broadly referred to in this specification as liquid polymer of butadiene. The liquid polymers of a conjugated diene polymerized either alone or with one or more copolymerizable materials will be refered to as a liquid polymer of conjugated dienes. It should be understood, that such liquid polymers are prepared by polymerizing at least 50 parts by weight conjugated dienes per 100 parts of total monomer.

The stripping medium or gas can be any gas which is inert toward the polymers under the stripping condition. Examples of such gases include nitrogen, steam, saturated hydrocarbons, carbon dioxide, oxygen free flue gases and the like. In any event the gas should be oxygen free in order that it be inert.

We have found that the quality of the casting is improved when the bubble forming material is removed, i. e. materials which form bubbles at the temperature used to solidify the polymer. It is believed that these materials are low molecular weight polymers, however, we are not limited to any theory as to their particular nature. We have found that when the liquid polymer at a temperature in the range of 220–425° F. is stripped with an inert gas at a pressure of atmospheric or less for a period of time sufficient to remove substantially all of the material volatile under these conditions, a void-free casting can be made from such a stripped polymer. The amount of material removed will be dependent upon the particular liquid polymer, but, in general, the amount of material which is volatile under the above conditions will be in the range of 0.5 to 10 weight percent of the original polymeric mixture. We have found that excellent results are generally obtainable when 1.5 to 3 percent of the total polymer is removed by stripping.

The stripping process can be carried out either batchwise or continuously. The conditions for best results will vary depending upon the efficiency of the process. In general, the process will be operated at a temperature in the range of 220–425° F., a pressure in the range of 0.5 to 760 mm. of mercury and a gas to liquid polymer ratio in the range of 30 to 25,000 volumes of gas per volume of liquid polymer. However, higher volumes of gas can be used, e. g. 50,000 volumes per volume of liquid, the only limitation being that of equipment. For example one would not use a volume of gas which would blow the liquid out of the system. These ratios are based on gas volume at the conditions being used. For example, we have found in a batch operation that very good results are obtained when operating at a temperature in the range of 300–395° F. and a pressure in the range of 20–760 mm. of mercury (absolute). The total time can vary from 5 to 300 minutes but it is preferred to operate the process for a time in the range of 15–45 minutes. The rate of flow of inert gas required to obtain the desired stripping should not be less than 4 volumes per minute for each one volume of liquid polymer to be stripped, however, the rate required will be dependent upon time, temperature and pressure. That is, a higher rate will be required at lower temperatures or for shorter periods of time. We have found that when batch stripping under the preferred conditions, supra, a rate of 20 volumes gas per minute for each one volume of liquid polymer will give the desired results.

In a continuous system, a different set of optimum conditions from that required in the batch process might prevail. For example, in a falling film evaporator, we found that the optimum temperature is in the range of 300–350° F. and the preferred pressure is a pressure in the range of 20–300 mm. of mercury (absolute). The residence time for the polymer lies in the range of 3–100 seconds and preferably in the range of 10–50 seconds for the optimum operating conditions. The rate of flow of inert gas to the falling film evaporator is generally in the range of 1000 to 25,000 volumes per volume of liquid polymer and more preferably the rate will be in the range of 7,000 to 25,000 volumes gas per volume of polymer. In the case of other continuous strippers, e. g. bubble tray, the conditions will be dependent upon the system. That is the conditions and rates will be affected by the contact efficiency of the system. In general, the quality of the casting is improved, at least to some extent, if any of the volatile material is removed. The broad temperature range is 220–425° F., the pressure range from 0.5 mm. of mercury absolute to atmospheric or even slightly in excess of atmospheric, e. g. where gas is blown rather than pulled through the system, the gas to liquid ratio being in the range of 30 to 25,000 volumes gas per volume of liquid. In general, any stripping is helpful and an excess of stripping is not detrimental, but would be avoided for economic reasons. Most generally, the material will be stripped at a subatmospheric pressure generally in the range of 20–300 millimeters of mercury absolute, at a temperature in the range of 300–395° F. and using a volume of inert gas in the range of 1000–25,000 volumes of gas per volume of liquid polymer.

The liquid polymer which has been stripped by the process previously described may be thermally polymerized by heating the polymer to a temperature in the range of 340 to 550° F., preferably between 425 and 550° F. for a period in the range between 0.5 and 100 hours, preferably between 2 and 10 hours. The casting procedure may be carried out in either an open or closed container but it is most advantageously carried out by heating in a closed container under an inert atmosphere as the presence of oxygen tends to discolor the castings. In the casting step, various catalysts can be used to catalyze the gelling of the liquid polydiene. Peroxide catalysts are an example of catalysts which may be used. When such catalysts are used, setting temperatures lower than the above specified range can frequently be employed.

Castings prepared in this manner can be easily removed from whatever type mold is used. These castings have excellent physical properties such as flexural strength, flexural modulus, tensile strength, heat distortion characteristics and load deformation characteristics. The casting has good chemical resistance and is especially resistant to strong caustic solution.

As an example of this new and novel process, the following descriptive procedure will illustrate the method of this invention. One thousand grams of liquid polybutadiene, prepared by a sodium catalyzed polymerization process and having a Saybolt Furol viscosity of 1500 seconds and an inherent viscosity [1] of 0.073 (employing benzene as solvent) is stripped of its volatile materials by heating the liquid polybutadiene to a constant temperature of 350° F. under a pressure of 50 mm. of mercury (absolute) and simultaneously passing superheated nitrogen through the liquid polymer at the rate of 200 ccs. per minute (measured at atmospheric pressure and 25° C.). The polymer is stripped under the above conditions for 30 minutes. The stripped liquid polybutadiene is then thermally polymerized at 473° F. to form a void-free thermosetting casting having good heat stability and solvent resistance.

EXAMPLE I

Several batch type stripping runs were made in a 500 ml. or a 2 liter Clisen flask placed in an electrically heated oil bath regulated at the desired stripping temperature. The Claisen flask was fitted with a thermocouple well, a tube for introducing either nitrogen or steam, and a condenser and vacuum assembly. The results of these runs are summarized in the following table. In these runs nitrogen was heated and used as the inert gas, however the volume of nitrogen used was measured at atmospheric pressure and 25° C. Calculations were made using the gas law and assuming the nitrogen temperature and pressures being the average of the pot to obtain the cc. gas to cc. of liquid ratio. Liquid polybutadiene used in these runs was prepared by a sodium catalyzed mass polymerization process and had a Saybolt Furol viscosity of 1525 seconds at 100° F.

[1] Defined in footnote in column 5.

Table I

| Run | Pot Temp., °F. | Time Minutes | Pressure, mm. Hg (abs.) | N² Flow, cc./min. | Grams Polymer Before Stripping | Cal. Vol. gas/ vol. poly. | Percent Ovhd. Product | Voids |
|---|---|---|---|---|---|---|---|---|
| 1 | 284–392 | 25 | 0.3–1.0 | 10–40 | 174.9 | 5,355 | 2.4 | No. |
| 2 | 332–356 | 25 | 20 | 800 | 278.5 | 3,690 | 3.6 | No. |
| 3 | 392 | 45 | 760 | Vigorous | 614 | | 2.29 | No. |
| 4 | (*) | (*) | (*) | (*) | (*) | (*) | (*) | Yes. |

* Not stripped.

The tests for void formation in the runs in the table above were made by heating the polymer in a 22 mm. test tube placed in an electrically heated, stirred silicone bath with the temperature controlled at 473° F. A sample of unstripped polybutadiene was thermally polymerized under these conditions to form a thermosetting casting which contained a large number of voids.

EXAMPLE II

A run was made in which liquid polybutadiene was stripped with super-heated steam at atmospheric pressure. 1050 grams of liquid polybutadiene, prepared by a sodium-catalyzed polymerization process and having a Saybolt Furol (SFS) viscosity at 100° F. of 1525 and an inherent viscosity [2] of 0.0729, was charged to a two liter flask and heated. Superheated steam was then passed through the polymer at atmospheric pressure, and the volume of the steam was measured at atmospheric pressure and the exact steam temperature.

Table II

| Cut | Time, Min. | Temp, °F. | Steam Temp., °F. | Overhead Product | | Steam Flow, cc. Steam/min. |
|---|---|---|---|---|---|---|
| | | | | Water, ml. | Hydrocarbon, ml. | |
| 1 | 10 | 350 | 352 | 47 | 4.5 | 9,570 |
| 2 | 15 | 350 | 356 | 54 | 3.5 | 7,370 |
| 3 | 15 | 350 | 341 | 72 | 3.0 | 9,800 |
| 4 | 20 | 350 | 348 | 79 | 3.0 | 10,770 |
| 5 | 15 | 350 | 352 | 72 | 2.5 | 9,880 |
| 6 | 20 | 370 | 374 | 91 | 3.5 | 9,520 |
| 7 | 15 | 390 | 386 | 48.5 | 2.5 | 6,910 |
| 8 | 20 | 370 | 386 | 86 | 5 | 8,950 |
| 9 | 25 | 360 | 375 | 99 | 4 | 8,150 |
| 10 | 20 | 390 | 386 | 93.5 | 2.5 | 10,000 |
| 11 | 20 | 395 | 392 | 85 | 4 | 9,150 |
| 12 | 20 | 395 | 374 | 104 | 4 | 11,220 |
| 13 | 20 | 390 | 374 | 81 | 2.5 | 8,660 |
| 14 | 15 | 390 | 374 | 80 | 2 | 11,400 |
| 15 | 15 | 390 | 374 | 70 | 1.5 | 9,970 |

Total time elapsed was 4 hours and 25 minutes.

The total elapsed time for this run was 265 minutes. The stripped polymer was very viscous having a SFS viscostiy at 100° F. of 36,600 seconds and an inherent viscosity [2] of 0.1880. This polymer gave a void-free casting when heated at 500° F. The average volume gas to volume of polymer was calculated as 2140 cc./cc.

EXAMPLE III

A series of runs with approximately one liter of polymer were made in a 2 liter flask and composited in two samples. Stripping temperatures were 350–400° F. over a period of 45–55 minutes for each batch with nitrogen flow of 100–125 ml./min. measured at 25° C. and atmospheric pressure. The nitrogen was preheated after measuring. The polymer was stripped at 5 mm. mercury pressure (absolute). The first composite sample (stripped) had a SFS 100° F. viscosity of 3605 and the overhead hydrocarbon phase was found to be 2.58 percent of the

[2] Inherent viscosity determined in benzene solution and calculated as $$[N] = \frac{\ln Nrel}{C}$$

where Nrel is the ratio of the viscosity of the polymer solution to the viscosity of the pure solvent and C is the concentration of polymer in solvent in grams per 100 ml. of solvent.

original material. The other composite sample (stripped) had a SFS 100° F. viscosity of 3485, an inherent viscosity of 0.0864, and the overhead hydrocarbon phase was found to be 2.56 percent of the original material. The stripped material gave void-free castings when poured into molds and heated. Using average temperatures, pressures and flow rates the gas to liquid ratio was calculated as 1330 cc./cc.

EXAMPLE IV

Several continuous stripping runs were made in which liquid polybutadiene which could be thermally polymerized at 473° F. to form void-free castings was produced.

In these runs a falling film type apparatus was used which consisted of a vertical glass tube 1 inch in diameter and 33 inches high with internal projections similar to a Vigreux column. This tube was fitted with a glass jacket heated with an electric heating coil and a reflux condenser attached to the top of the jacket space. Refluxing of liquid in the jacket heated the column. Temperature was regulated by use of a refluxing liquid which boiled at the desired temperature.

Liquid polybutadiene prepared by a sodium catalyzed polymerization process was charged at the top of the column from a graduated 2 liter burette and continuously removed from a receiver attached to the bottom of the column, into an accumulator by vacuum. The receiver at the bottom of the column was heated by an oil bath at the steam temperature to prevent water condensate from collecting. Further drying of the polymer was effected by operating the accumulator at about 2 mm. Hg pressure compared to 90 or 130 mm. Hg pressure on the column.

Steam was superheated to the desired temperature by a gas burner and fed to the bottom of the column.

Liquid polybutadiene used in Table III has a Saybolt Furol viscosity at 100° F. of 1525 seconds. The liquid polybutadiene as received had been previously vacuum flashed and was substantially free of low boiling hydrocarbon solvent. In order to approximate liquid polybutadiene which had received a pre-stripping treatment only, 10 percent heptane was added to the sample and thoroughly mixed. The inert gas stripping removes not only the hydrocarbon solvent but also an additional material which is probably a low molecular weight polymer. The jacket column was charged with ethylene glycol, B. P. 387° F., for runs listed in Table III. Under operating conditions liquid polybutadiene as received when introduced at the top of the column flowed through the tube in 22 seconds. When 10 percent heptane was added to the polymer, the time to flow through the tube was 13 seconds. In this example of a falling film type extractor as much as 40,900 mol gas per volume of liquid was used without adverse effect on the quality of the casting.

Table III

| Run | Polymer Charge Rate, Grams/min. | Steam Temp., °F. | Pressure, mm. Hg | Grams Steam Fed/Gram Polymer Fed | Cal. cc. gas/cc. liquid | SFS, 100° F. | Voids |
|---|---|---|---|---|---|---|---|
| 1 | 12.2 | 400 | 130 | .29 | 3,330 | 2,190 | None. |
| 2 | 1.8 | 400 | 130 | 3.57 | 40,900 | | None. |
| 3 | 4.94 | 400 | 130 | .806 | 9,190 | 2,391 | None. |
| 4 | 24.9 | 400 | 130 | .178 | 2,040 | 1,796 | None. |

The reflux jacket was drained of ethylene glycol and then charged with p-methylcyclohexanol, B. P. 343° F., and the next runs made at this temperature. The liquid polybutadiene used in these runs had a Saybolt Furol viscosity of 1336 seconds and an inherent viscosity of 0.0814. Heptane amounting to 9.95 percent of the polymer was added and thoroughly mixed for use in the stripping studies listed in Table IV.

Table IV

| Run | Polymer Charge Rate, Grams/min. | Steam Temp., °F. | Pressure, mm. Hg | Grams Steam Fed/Gram Polymer Fed | Cal. cc. gas/cc. liquid | SFS, 100° F. | Voids |
|---|---|---|---|---|---|---|---|
| 1 | 3.5 | 350 | 90 | 1.56 | 24,200 | 2,584 | None. |
| 2 | 5.51 | 350 | 90 | 1.01 | 15,700 | 2,160 | None. |
| 3 | 5.08 | 350 | 130 | 1.03 | 16,000 | 2,157 | None. |
| 4 | 13.31 | 350 | 130 | .47 | 7,300 | 1,883 | None. |
| 5 | 4.75 | 350–380 | 90 | 1.15 | 18,250 | 2,139 | None. |
| 6 | 3.40 | 350–365 | 90 | 1.73 | 27,100 | 2,527 | None. |

All samples were thermally polymerized to void free thermosetting casts at 473° F. by heating in a 22 mm. test tube placed in an electrically heated, stirred silicone bath. No decomposition was noted at 473° F.

EXAMPLE V

Liquid polybutadiene was stripped by the method of Example I under the following conditions: Vigorous nitrogen flow, 0.2 to 0.5 mm. Hg pressure, temperature—392° F., processing time—80 minutes.

The liquid polybutadiene which was stripped under the above-described conditions was cast by the following procedure: Several 12" long x 1" diameter Pyrex test tubes were coated on the interior with silicone stopcock grease to prevent adhesion of the castings to the glass. The tubes were then filled to a depth of 5 or 6 inches with polybutadiene which had been stripped under the conditions described above. Dissolved gases were removed from the polymer by warming the tubes containing the polymer while keeping the polymer under oil pump vacuum. The tube contents were then covered with carbon dioxide using a manifold of cork stoppers, glass T's, and flexible tubing and the tubes were then placed in a stirred silicone oil bath regulated to 245° C. or 262° C. At intervals of two hours, beginning after four hours of heating, five tubes were removed from the bath and replaced by five empty tubes to maintain the bath at the same level. The castings were then removed from the tubes and tested. All of the castings were void-free. The castings prepared from liquid polybutadiene had excellent physical properties as determined by tests for density, shore hardness, flexural strength, flexural modulus, tensile strength, and other tests. The castings also showed excellent resistance to chemical attack.

The process of this invention has been illustrated in terms of liquid polybutadiene, however it should be understood, that any of the liquid polymers of a conjugated diene as disclosed can be improved by the process of this invention.

We claim:

1. A method for preparing void-free castings from a solvent free liquid polymer prepared by polymerizing monomeric material comprised of at least 50 weight percent conjugated diene which comprises removing 0.5 to 10 weight percent of said liquid polymer by passing an inert gas through said liquid polymer, casting the remaining stripped polymer into suitable molds, and heating the thus cast material until solidified.

2. The method of claim 1 wherein 1.5 to 3 weight percent of said liquid polymer is removed by stripping.

3. A method for preparing void-free castings from a solvent free liquid polymer prepared by polymerizing monomeric material comprised of at least 50 weight percent conjugated diene said method comprising heating and maintaining said liquid polymer to a temperature in the range of 220–425° F. and at a pressure in the range of 0.5 to 760 millimeters of mercury, absolute, passing an inert gas through the heated polymer for a time sufficient to remove from 0.5 to 10 weight percent of said liquid polymer, casting the remaining polymer into molds, and heating the thus cast polymer until it solidifies.

4. The method of claim 3 wherein a volume of gas in the range of 30 to 50,000 volumes of gas per volume of polymer is passed through the said liquid polymer.

5. A process for preparing void-free castings from a solvent free liquid polymer prepared by polymerizing monomeric material comprising at least 50 weight percent conjugated diene said process comprising passing a volume of inert gas in the range of 1000 to 25,000 volumes per volume of liquid polymer through said liquid polymer at a pressure in the range of 20 to 300 millimeters of mercury, absolute, and at a temperature in the range of 300–395° F. so as to remove from 1.5 to 3 percent of said liquid polymer by stripping, casting the resulting stripped material into molds, heating the thus cast material at a temperature in the range of 425 to 550° F. for a period of time in the range of 2 to 10 hours so as to cause said liquid polymer to solidify.

6. The process of claim 5 wherein the liquid polymer is liquid polybutadiene.

7. The process of claim 6 wherein the inert gas is nitrogen.

8. The process of claim 6 wherein the inert gas is steam.

9. The process of claim 5 wherein the liquid polymer is a liquid copolymer of 1,3-butadiene with styrene.

10. A method of treating a solvent free liquid polymer of a conjugated diene which comprises passing an inert gas through said polymer until 0.5 to 10 weight percent of said polymer has been removed.

11. The method of claim 10 wherein said conjugated diene is butadiene 1,3.

References Cited in the file of this patent

UNITED STATES PATENTS

| | | |
|---|---|---|
| 1,901,045 | Schmidt | Mar. 14, 1933 |
| 2,379,268 | Zimmer | June 26, 1945 |
| 2,451,332 | Green | Oct. 12, 1948 |
| 2,631,175 | Crouch | Mar. 10, 1953 |